US008203066B2

(12) United States Patent
Maruyama

(10) Patent No.: US 8,203,066 B2
(45) Date of Patent: Jun. 19, 2012

(54) PEDAL APPARATUS AND ELECTRONIC KEYBOARD APPARATUS HAVING THE SAME

(75) Inventor: Tsuyoshi Maruyama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 330 days.

(21) Appl. No.: 12/576,183

(22) Filed: Oct. 8, 2009

(65) Prior Publication Data

US 2010/0089225 A1 Apr. 15, 2010

(30) Foreign Application Priority Data

Oct. 9, 2008 (JP) ................................ 2008-262770

(51) Int. Cl.
*G01P 3/00* (2006.01)

(52) U.S. Cl. ........................................................ 84/626

(58) Field of Classification Search ..................... 84/626
See application file for complete search history.

(56) References Cited

U.S. PATENT DOCUMENTS 7,589,275 B2 * 9/2009 Arimoto ......................... 84/723

FOREIGN PATENT DOCUMENTS

JP 2000-235392 8/2000

OTHER PUBLICATIONS

Notification of First Office Action mailed Dec. 21, 2011, for CN Patent Application No. 200910204312.3, with English Translation, 15 pages.

* cited by examiner

*Primary Examiner* — Jianchun Qin
(74) *Attorney, Agent, or Firm* — Morrison & Foerster LLP

(57) ABSTRACT

An electronic keyboard apparatus capable of changing, with a simple construction, a musical tone control characteristic for each pedal manipulation stroke section. A detection value representing a pedal depression depth is converted into an output value according to a table group, and a musical tone parameter is controlled based on the output value. The table group includes default and alternate tables exhibiting a hysteresis such that the output value converted from the same detection value becomes smaller in a reverse pedal stroke than in a forward pedal stoke. In the forward stroke, the default table is changed to the alternate table when the detection value passes a second threshold value provided on a deeper depression depth side than a first threshold value. In the reverse stroke, the alternate table is changed to the default table when the detection value passes the first threshold value.

10 Claims, 5 Drawing Sheets

PEDAL APPARATUS AND ELECTRONIC KEYBOARD APPARATUS HAVING THE SAME

BACKGROUND OF THE INVENTION

1. Field of the Invention

The present invention relates to a pedal apparatus for outputting a control signal for use in controlling a musical tone parameter, and an electronic keyboard apparatus having the pedal apparatus.

2. Description of the Related Art

Conventionally, an electronic keyboard apparatus that performs musical tone control in response to a pedal manipulation is known. Also, a pedal apparatus is known that outputs a signal for use by an electronic keyboard apparatus for musical tone control. For example, Japanese Laid-open Patent Publication No. 2000-235392 discloses a pedal sensor adjusting apparatus that controls, e.g., a reverberation time based on a half-pedal value, which is output in response to a pedal manipulation, by referring to a table in which a relationship between damper pedal stroke and half-pedal value is defined.

An acoustic piano has a damper pedal configured to generate a reaction force whose magnitude is different between when the pedal is depressed and when the pedal depression is released. In other words, the reaction force exhibits a so-called hysteresis. Accordingly, a player feels that a half-pedal region is present on a shallower pedal depression side in a forward stroke than in a reverse stroke of the pedal.

On the other hand, in an ordinary electronic keyboard apparatus, hysteresis is not present in a reaction force against the pedal depression, and therefore, a player feels that the half-pedal region is present in the same position between the forward and reverse strokes, if the half-pedal region is controlled by the apparatus disclosed in Japanese Laid-open Patent Publication No. 2000-235392. As a result, a pedal manipulation feeling becomes different from that in an acoustic piano, resulting in a feeling of incompatibility.

It appears possible to realize, in an electronic keyboard apparatus, a feeling in a half-pedal region similar to that in acoustic piano by using a pedal apparatus configured to generate a reaction force with a hysteresis between when the pedal is depressed and when the depression is released. However, the resultant keyboard apparatus becomes complicated in mechanical construction and high in cost, which poses a problem.

Not only for the damper pedal but also for, e.g., a shift pedal, it is sometimes preferable to generate a reaction force having a hysteresis between the forward and reverse pedal strokes.

SUMMARY OF THE INVENTION

The present invention provides a pedal apparatus capable of changing, with a simple construction, a characteristic of pedal manipulation responsive musical tone control for each pedal manipulation stroke section, and provides an electronic keyboard apparatus having the pedal apparatus.

According to a first aspect of this invention, there is provided a pedal apparatus for outputting a control signal for use by an electronic keyboard apparatus to control a musical tone parameter, which comprises a pedal operable in forward and reverse directions by a depression manipulation and a depression-releasing manipulation, a detection unit configured to detect a detection value representing a position of the pedal in a depression depth direction, a conversion unit having a plurality of conversion patterns each for conversion of the detection value detected by the detection unit to an output value, the conversion unit being configured to change a conversion pattern to be used for the conversion on condition that the detection value passes a threshold value in a forward or reverse stroke of the pedal and convert the detection value to the output value in accordance with the conversion pattern after change, and an output unit configured to output, as the control signal, the output value converted by the conversion unit.

According to the pedal apparatus of this invention, the characteristic of the musical tone control responsive to pedal manipulation for each pedal manipulation stroke section can be changed with a simple construction.

A hysteresis section, in which the output value converted by the conversion unit from the same detection value detected by the detection unit becomes smaller in the reverse stroke than in the forward stroke of the pedal, can be present in a conversion characteristic exhibited by the conversion unit in a case where the pedal is reciprocated over an entire stroke between a non-depressed position and a depression end position of the pedal.

In that case, a hysteresis for musical tone control can be provided between the forward and reverse strokes of the pedal.

An intermediate section in which a degree of change in the output value with a change in the detection value is small can be present in a pedal depression depth section between the non-depressed position and the depression end position of the pedal, and the hysteresis section can be provided adjacent to at least one of a shallow depression depth side and a deep depression depth side of the intermediate section.

In that case, when the pedal is a damper pedal, a start position and/or an end position of a half-pedal region can be made different between the forward and reverse strokes.

The intermediate section can be provided on a side where the depression depth is deeper in the reverse stroke than in the forward stroke of the pedal.

In that case, the player feels that the half-pedal region is present on the side where the depression depth is deeper in the reverse stroke than in the forward stroke, whereby a pedal manipulation feeling can be made close to that in an acoustic piano.

A plurality of the threshold values can be provided, and the conversion unit can decide the conversion pattern to be used for the conversion according to one of the threshold values precedingly passed by the detection value and a direction to which another threshold value is currently passed by the detection value.

In that case, the conversion pattern can appropriately be selected, even if the direction of pedal manipulation is changed at a depression depth short of the manipulation end position.

A plurality of the threshold values can be provided, and the threshold values can at least include values respectively corresponding to the non-depressed position and the depression end position of the pedal.

In that case, the characteristic of the musical tone control responsive to pedal manipulation can be switched between the forward and reverse strokes when the pedal is reciprocated over the entire stroke.

According to a second aspect of this invention, there is provided a pedal apparatus for outputting a control signal for use by an electronic keyboard apparatus to control a musical tone parameter, which comprises a pedal operable in forward and reverse directions by a depression manipulation and a depression-releasing manipulation, a detection unit configured to detect a detection value representing a position of the pedal in a depression depth direction, a conversion unit configured to convert the detection value detected by the detection unit into an output value, and an output unit configured to output, as the control signal, the output value converted by the conversion unit, wherein a hysteresis section, in which the output value converted by the conversion unit from the same detection value detected by the detection unit becomes smaller in the reverse stroke than in the forward stroke of the pedal, is present in a conversion characteristic exhibited by the conversion unit in a case where the pedal is reciprocated over an entire stroke between a non-depressed position and a depression end position of the pedal.

According to the pedal apparatus of this invention, hysteresis in the musical tone control can be provided, with a simple construction, between the forward and reverse strokes of the pedal.

According to third and fourth aspects of this invention, there are provided electronic keyboard apparatuses respectively including the pedal apparatuses according to the first and second aspects of this invention.

According to the electronic keyboard apparatus of this invention, a characteristic of musical tone control responsive to pedal manipulation can be changed, with a simple construction, for each pedal manipulation stroke section.

Further features of the present invention will become apparent from the following description of an exemplary embodiment with reference to the attached drawings.

DETAILED DESCRIPTION OF THE PREFERRED EMBODIMENT

The present invention will now be described in detail below with reference to the drawings showing a preferred embodiment thereof.

Figure 1:
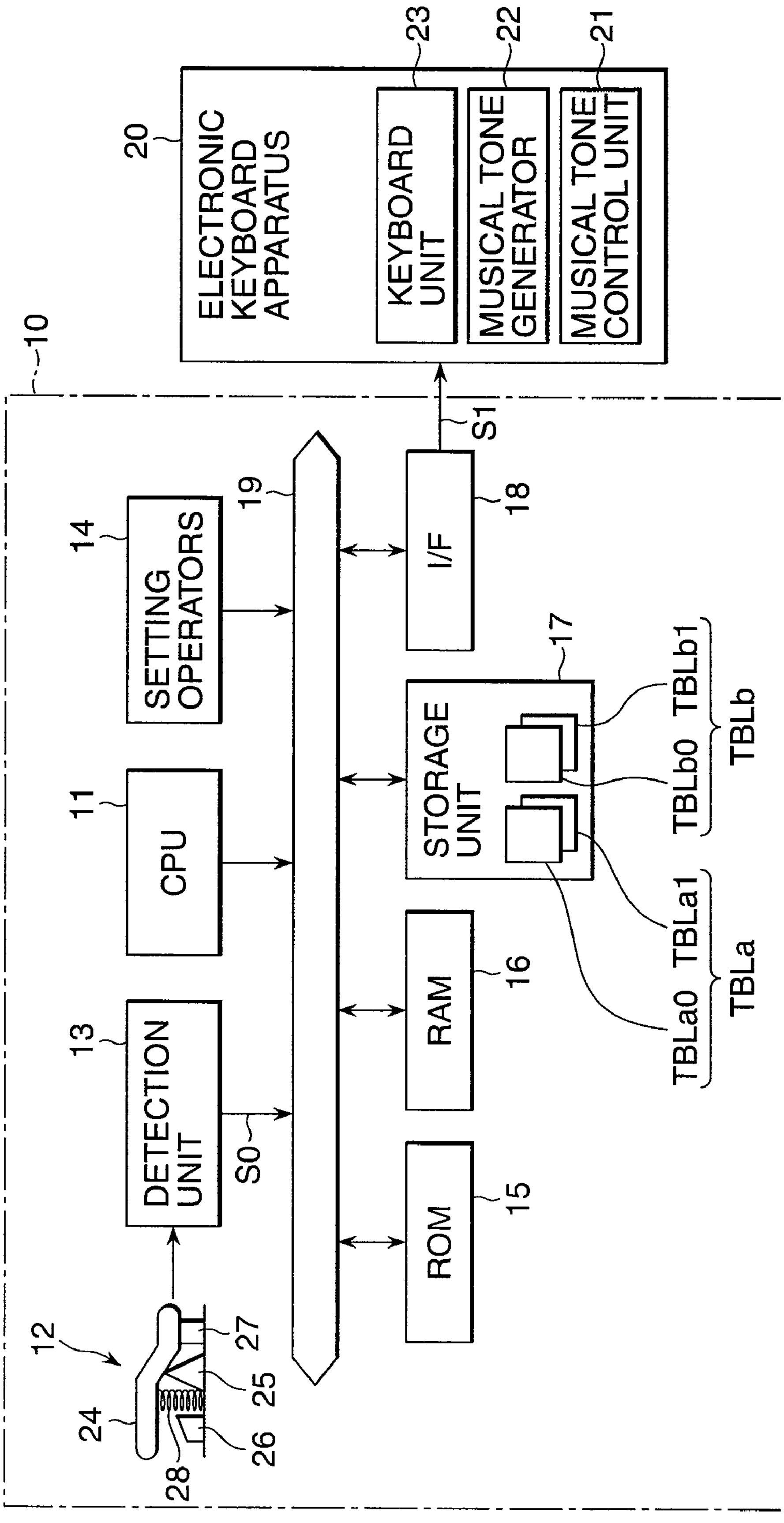
FIG. 1 is a block diagram showing the construction of a pedal apparatus according to one embodiment of this invention and the construction of an electronic keyboard apparatus that uses the pedal apparatus.

FIG. 1 shows in block diagram the construction of a pedal apparatus according to one embodiment of this invention and the construction of an electronic keyboard apparatus using the pedal apparatus.

In this embodiment, a pedal apparatus 10 fabricated (sold) separately from an electronic keyboard apparatus 20 is connected to the keyboard apparatus 20, and a control signal S1 output from the pedal apparatus 10 is used by the keyboard apparatus 20 for musical tone control. The keyboard apparatus 20 is the same in construction as an ordinary electronic keyboard apparatus except that it is able to use the control signal S1 supplied from the external pedal apparatus 10.

The keyboard apparatus 20 includes, roughly speaking, a keyboard unit 23, a musical tone generator 22, and a musical tone control unit 21. The keyboard unit 23 includes a plurality of keys. The musical tone generator 22 includes a tone generator circuit, an effect circuit, a sound system, etc., and is configured to generate electronic musical tones (e.g., piano tones) based on signals generated in response to the keyboard unit 23 being manipulated and preset performance data. The musical tone control unit 21 controls musical tone parameters for tones generated by the musical tone generator 22. The musical tone parameters include sound volume, tone color, sustain length, etc.

The musical tone parameter control, which includes, e.g., a resonance generation process responsive to damper pedal manipulation, is performed based on the control signal S1 output from the pedal apparatus 10 as well as based on signals generated by manipulations on effect operators, not shown. The keyboard apparatus 20 can have its own pedal, however, manipulations on the own pedal are disregarded when the pedal apparatus 10 is connected to the keyboard apparatus 20. In that case, manipulations on the pedal apparatus 10 are reflected on the musical tone control.

The pedal apparatus 10 includes a detection unit 13, setting operators 14, ROM 15, RAM 16, storage unit 17, and interface (I/F) 18, which are connected via a bus 19 to a CPU 11, and also includes a pedal unit 12 connected to the detection unit 13.

As schematically shown in FIG. 1, the pedal unit 12 includes a pedal 24 pivotable about a fulcrum 25 in response to depression and depression-releasing manipulations thereon. A stopper 27 is disposed below a rear end of the pedal 24. As with an ordinary pedal, a reaction force against the depression of the pedal 24 is always applied to the pedal 24 from urging means 28 (e.g., spring). The reacting force acts in a direction opposite from the pedal depression direction (forward direction), i.e., acts in a reverse direction. When the pedal 24 is in a non-manipulated state, the pedal 24 is in contact at its rear end with the stopper 27, whereby a non-depressed position of the pedal 24 is regulated. An elastic stopper 26 is disposed below a front end of the pedal 24. A depression end position of the pedal 24 in a depression stroke (forward stroke) of the pedal 24 is regulated by the stopper 26 with which the front end of the pedal 24 is in contact.

The detection unit 13 includes a position sensor, an A/D converter, etc. The position sensor is disposed within the pedal unit 12 and detects a depression position (i.e., depth from the non-depressed position) of the pedal 24. Position information detected by the position sensor is converted by the A/D converter into a digital detection value, which is supplied as a detection signal S0 to the CPU 11. The position sensor is of, e.g., an optical type that is able to linearly detect the position information, but the construction and installation position are not limited. For example, the position sensor may be of a contact type or a magnetic type.

The CPU 11 controls the entire pedal apparatus 10. The setting operators 14 are used for various settings. The ROM 15 stores a control program executed by the CPU 11, table data, etc. The RAM 16 temporarily stores input information, flags, buffer data, calculation results, etc. The I/F 18 transmits the control signal S1 to the keyboard apparatus 20. The storage unit 17 stores application programs including the control program, and stores various data and a plurality of tables.

At least one table group including two or more tables is stored, as the tables, in the storage unit 17. In this embodiment, two table groups TBLa, TBLb are stored therein. The table group TBLa is comprised of a default table TBLa0 and an alternative table TBLa1, and the table group TBLb is comprised of a default table TBLb0 and an alternate table TBLb1.

Figure 2A:
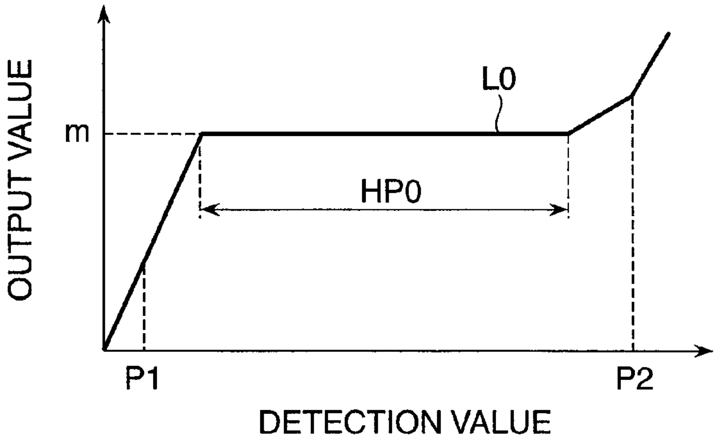
FIG. 2A is a conceptual view showing a default table for use by the pedal apparatus for conversion of detection value into output value.
Figure 2B:
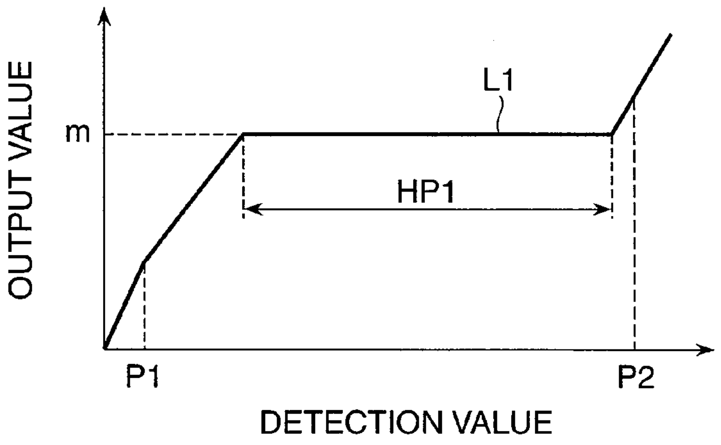
FIG. 2B is a conceptual view showing an alternate table for conversion of detection value into output value.
Figure 2C:
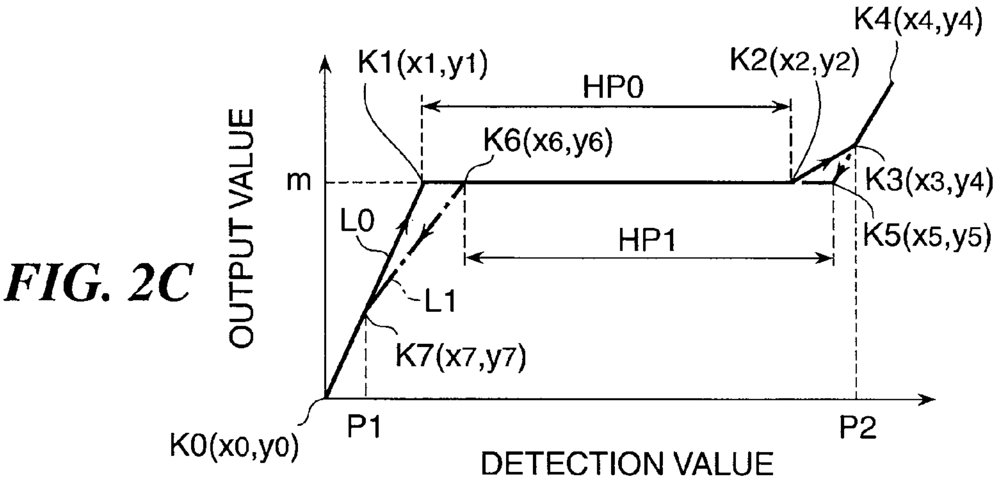
FIG. 2C is a conceptual view showing both the default table and the alternate table.

FIGS. 2A to 2C show in conceptual view the default table TBLa0, the alternative table TBLa1, and both the tables, respectively. In each of the tables TBLa0, TBLa1, the detection value (detection signal S0) representing the depression position of the pedal 24 and supplied from the detection unit 13 to the CPU 11 is taken along the abscissa. The pedal depression depth becomes deeper with increasing detection value. The output value (control signal S1) output from the I/F 18 is taken along the ordinate. Specifically, the control signal S1 is represented by a MIDI (Musical Instrument Digital Interface) value varying from 0 to 127, and becomes greater with increasing output value.

Each table functions as a conversion patter for converting a detection value of pedal depression position detected by the detection unit 13 into an output value of the I/F 18. The application purpose of the pedal 24, which is not limited, is determined by a table group used for the conversion. The table group TBLa is set to be suitable for the pedal 24 used as a damper pedal, whereas the table group TBLb is set to be suitable for the pedal 24 used as a shift pedal.

In FIGS. 2A and 2B, there are shown curves L0, L1 representing the default table TBLa0 and the alternative table TBLa1, respectively. These curves L0, L1 respectively include intermediate sections HP0, HP1 where the output value has a predetermined MIDI value m. It is assumed that these intermediate sections correspond to a half-pedal region. The intermediate section HP1 is located on the deeper side of pedal depression depth than the intermediate section HP0. Output values corresponding to the first and second threshold values P1, P2 are the same between the default table TBLa0 and the alternative table TBLa1.

In this embodiment, the table used for the conversion of detection value into output value is switched between the forward and reverse strokes of pedal depression. Specifically, the default table TBLa0 is selected when the pedal 24 is in a non-depressed state. Then, the table used for the conversion is switched from the default table TBLa0 to the alternative table TBLa1 when the detection value passes the second threshold value P2 in the forward stroke. Further, the table used for the conversion is switched from the alternative table TBLa1 to the default table TBLa0 when the detection value passes the first threshold value P1 in the reverse stroke started from a pedal depression region where the detection value is larger than the second threshold value P2.

As shown in FIG. 2C, the output value converted from the same detection value is smaller in the reverse stroke than in the forward stroke in a pedal depression depth section between the first threshold value P1 and an end of the intermediate section HP1 on the shallow depression depth side and in another depression depth section between the second threshold value P2 and an end of the intermediate section HP0 on the deep depression depth side. In other words, these two pedal depression depth sections serve as a so-called hysteresis section. The pedal depression depth section where the MIDI value m is output is located on the side where the pedal depression is deeper in the reverse stroke than in the forward stroke.

In a case where the pedal 24 is used as a damper pedal, the table group TBLa is used for the conversion of detection value into output value. In a case where the pedal 24 is used as a shift pedal, the table group TBLb is used for the conversion. The table group to be used for the conversion can be designated by using the setting operators 14. Depending on whether the pedal 24 is used as the damper pedal or the shift pedal, the user selects and sets how the musical tone parameter control based on the control signal S1 is executed.

In a case, for example, that the pedal 24 is used as the damper pedal, the musical tone control unit 21 controls musical tones generated by the musical tone generator 22 as described below. Specifically, if the output value is smaller than the MIDI value m, the control unit 21 executes sounding/muting processing in response to a key depressing/releasing operation so as to realize a state equivalent to a state of acoustic piano where a damper is complete contact with a string. For example, the control unit 21 does not generate resonance and immediately mutes a musical tone when key depression concerned is released. If the output value is equal to the MIDI value m, the control unit 21 executes a so-called half-pedal control. For example, the control unit 21 executes sounding/muting, tone color change, and limited resonance generation to realize a state equivalent to a state where a damper is in semi-contact with a spring. If the output value is larger than the MIDI value m, the control unit 21 executes control to realize a state equivalent to a state where a damper is out of contact with a spring. For example, the control unit 21 generates resonance and does not forcibly mute a musical tone when the key depression concerned is released.

Figure 3:
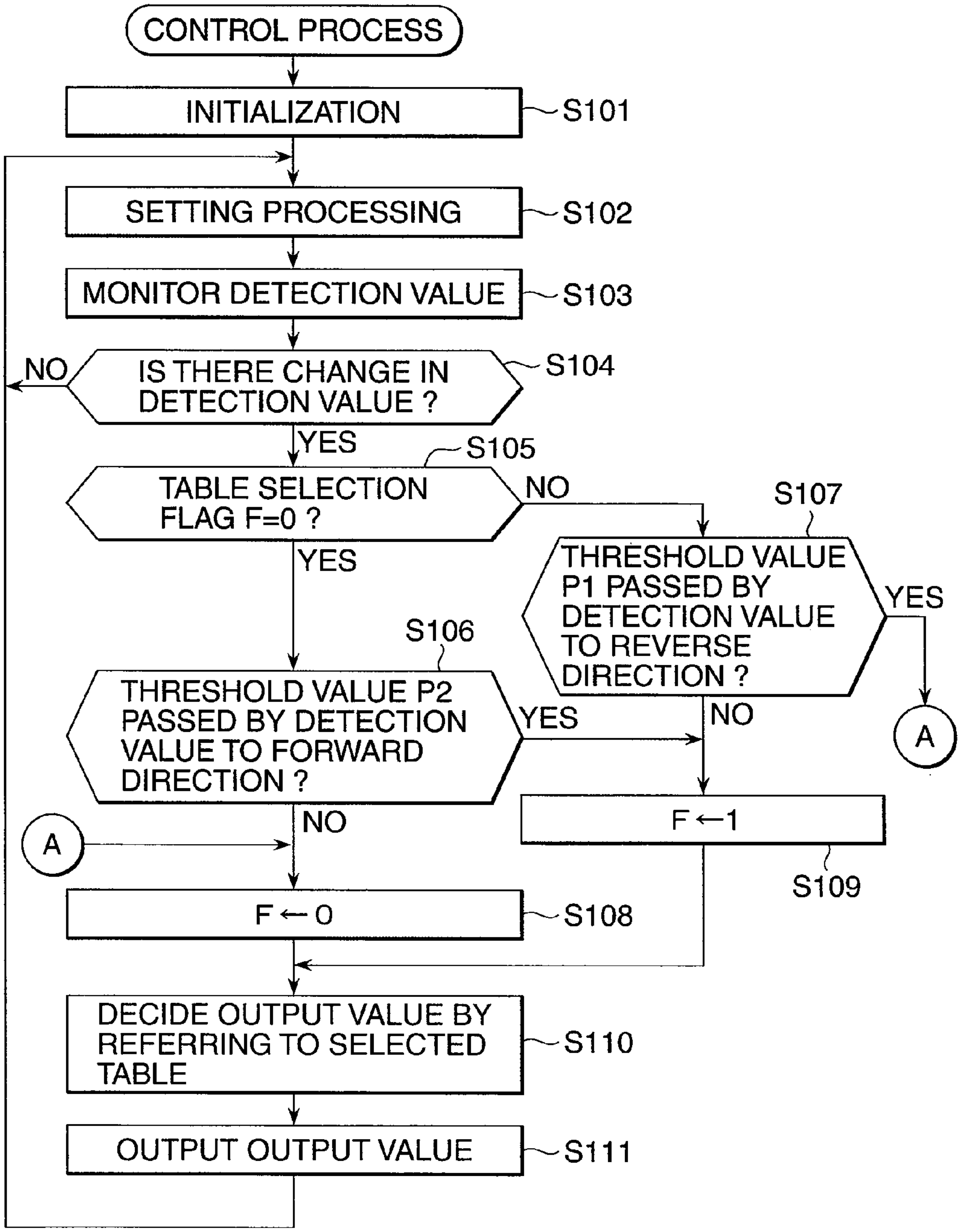
FIG. 3 is a flowchart showing a control process executed by a CPU of the pedal apparatus.

FIG. 3 shows in flowchart a control process executed by the CPU 11 of the pedal apparatus 10. First, initialization is executed to set initial values for various registers (step S101). Next, setting processing is carried out (step S102).

In the setting processing, various settings are performed, and processing other than various settings is also performed in response to the designation of the table group to be used for the conversion of detection value into output value. In the following, a description will be given of an example case where the table group TBLa is designated in order to use the pedal 24 as a damper pedal. A table selection flag F is used as information representing the table to be used for the conversion. The table selection flag F having a value of 0 represents that the default table is selected, whereas the flag F having a value of 1 represents that the alternate table is selected. The table selection flag F is set to a value of 0 at the initialization (step S101), is set to 0 in step S108, and is set to 1 in step S109.

Next, detection value monitoring processing is executed to monitor the detection signal S0 supplied from the detection unit 13 (step S103). If it is determined in step S104 that there is no change in the detection value (detection signal S0), the process returns to step S102. On the other hand, if there is a change in the detection value, whether the table selection flag F currently set has a value of 0 (default) is determined (step S105).

If the table selection flag F has a value of 0, whether the detection value passes the second threshold value P2 to the forward direction is determined (step S106). If it is determined that the second threshold value P2 is not passed by the detection value to the forward direction, the table selection flag F is kept unchanged from 0 (step S108), and the process proceeds to step S110. On the other hand, if the detection value passes the second threshold value P2 to the forward direction, the table selection flag F is set (switched) to 1 (step S109), and the process proceeds to step S110.

If it is determined in step S105 that the table selection flag F does not have a value of 0 but has a value of 1, whether the detection value passes the first threshold value P1 to the reverse direction is determined (step S107). If it is determined that the first threshold value P1 is not passed by the detection value to the reverse direction, the table selection flag F is kept unchanged from 1 (step S109), and the process proceeds to step S110. On the other hand, if the detection value passes the first threshold value P1 to the reverse direction, the table selection flag F is set (switched) to 0 (step S108), and the process proceeds to step S110.

In step S110, the default table TBLa0 or the alternative table TBLa1, whichever is represented by the currently set value of the table selection flag F, is selected as the table to be used for the conversion of detection value into output value, and based on the selected table, an output value corresponding to the detection value is decided (see, FIG. 2C). In step S111, the decided output value is output as the control signal S1 from the I/F 18 to the keyboard apparatus 20, and the process returns to step S102.

According to this embodiment, since the table used for the conversion is switched between the default table TBLa0 and the alternative table TBLa1 in most parts of the forward and reverse strokes of pedal manipulation, a hysteresis is provided in the musical tone control. As a result, although an actual reaction force acting on the pedal 24 is the same between forward and reverse strokes, the player feels that there is a hysteresis in the reaction force against the pedal manipulation.

In particular, in the case of using the table group TBLa for the conversion in order to use the pedal 24 as a damper pedal, since the section in which the MIDI value m is output is located on the side where the pedal depression depth is deeper in the reverse stroke than in the forward stroke, the player feels that a half-pedal region is present on the side where the pedal depression depth is deep, making it possible to make a manipulation feeling of the pedal 24 close to a pedal feeling in acoustic piano.

The default table and the alternate table of each table group are not limited to the above described tables. By appropriately setting the table group, the characteristic of musical tone control responsive to pedal manipulation can be set, with a simple construction, for each pedal manipulation stroke section. For example, the table group for damper pedal, other than the table group shown in FIG. 2, can be configured as shown in, e.g., FIGS. 4A to 4C.

Figure 4A:
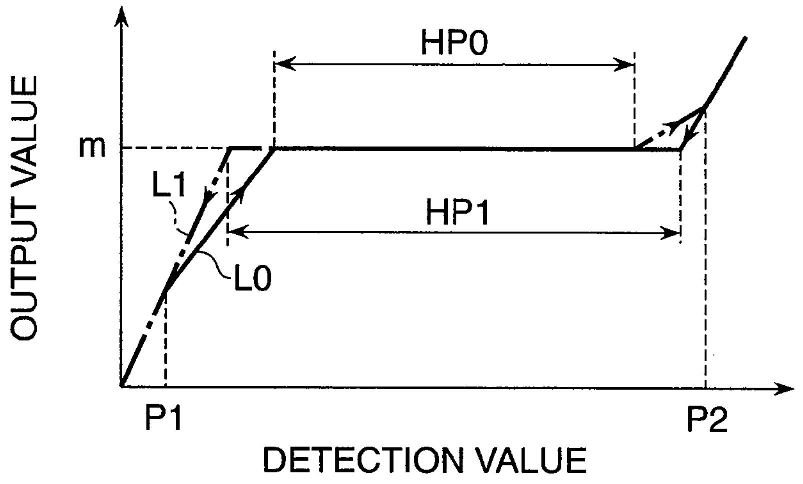
FIG. 4A to FIG. 4C are conceptual views showing first to third modifications of the table group shown in FIG. 2C.
Figure 4B:
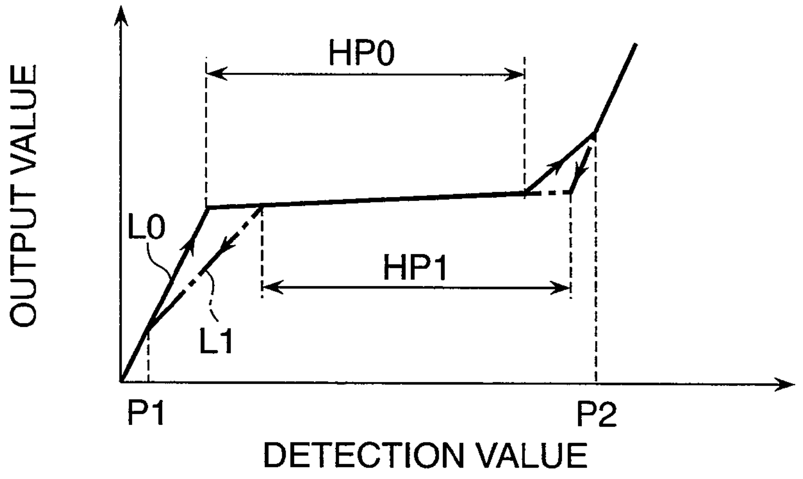
Figure 4C:
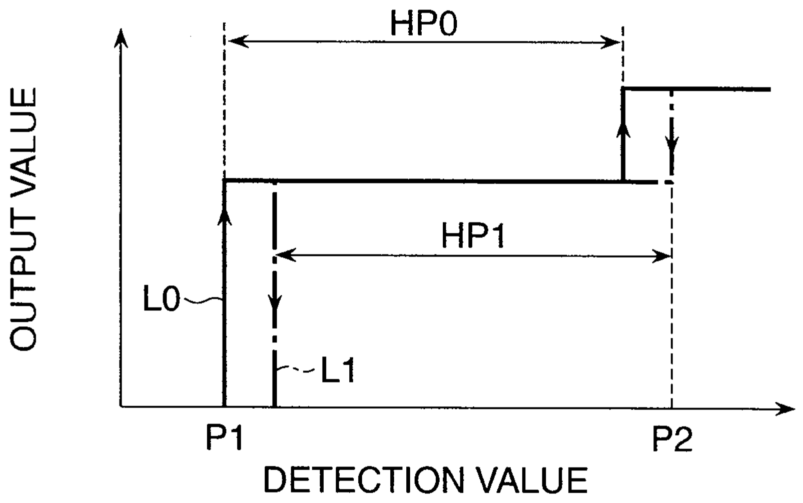

FIGS. 4A to 4C show, in conceptual view, first to third modifications of the table group shown in FIG. 2C. As in FIG. 2C, both the default table and the alternate table are shown in each of FIGS. 4A to 4C.

In the example shown in FIG. 2C, the section where the output voltage converted from the same detection value becomes smaller in the reverse stroke than in the forward stroke is provided on both the shallow depression depth side and the deep depression depth side of the intermediate section HP0. On the other hand, in the example shown in FIG. 4A, a section where the output voltage converted from the same detection value becomes greater in the reverse stroke than in the forward stroke is provided on the shallow depression depth side of the intermediate section HP0. In other words, the intermediate section HP1 is extended beyond the intermediate section HP0 on both the shallow depression depth side and the deep depression depth side. This is effective to enable the user to recognize the half-pedal region more clearly in the reverse stroke than in the forward stroke.

The example shown in FIG. 4B differs from the example in FIG. 2C in that the curves L0, L1 obliquely extend in the intermediate sections HP0, HP1. Specifically, the inclinations of curves L0, L1 (each corresponding to the degree of change of the output value with the change in the detection value) in the intermediate sections HP0, HP1 are set such that the output value is not constant but increases with the increasing detection value, making it possible to perform effective musical tone control in the half-pedal region, such as delicately changing tone color in accordance with the depression depth of the pedal 24.

In the example of FIG. 4C, the curves L0, L1 do not extend obliquely but extend horizontally or vertically in the intermediate sections HP0, HP1 and in regions on the shallow depression depth side and on the deep depression side thereof. Thus, the output value varies between three levels with the change in the detection value. These curves L0, L1 are suitable for use in simple three-stage musical tone control to selectively establish one of a pedal non-depression state, a half-pedal state, and a pedal depression state.

It should be noted that in the examples in FIG. 2C and FIGS. 4A to 4C, a hysteresis section where the output value converted from the same detection value becomes smaller in one of the forward and reverse strokes than in the other can be provided only either one of the shallow depression depth side and the deep depression depth side of each of the intermediate sections HP0, HP1. In that case, the start or end position of the half-pedal region can be made different between the forward stroke and the reverse stroke.

In the examples of FIG. 2C and FIGS. 4A to 4C, the first threshold value P1 is set so as to correspond to a position which is slightly deeper than the non-depressed position, and the second threshold value P2 is set so as to correspond to a position which is slightly shallower than the depression end position. As a result, the table switching can be made, even if the pedal manipulation direction is reversed at a depression depth short of the first or second threshold value P1, P2 without the pedal being manipulated over the entire pedal stroke. The above is compatible with a practical pedal reciprocating manipulation.

It should be noted that the first threshold value P1 can be set so as to correspond to the non-depressed position of the pedal, and the second threshold value P2 can be set so as to correspond to the pedal depression end position. In that case, the characteristic of musical tone control responsive to pedal manipulation is switched between the forward stroke and the reverse stroke when the pedal is reciprocated over the entire pedal stroke.

As will be described with reference to FIGS. 5A to 5C, three or more tables can be provided in one table group and one of these tables can selectively be used. In that case, three or more threshold values are set, and the table to be used for the conversion is decided according to a threshold value precedingly passed by the detection value and a direction to which the detection value currently passes another threshold value.

Figure 5A:
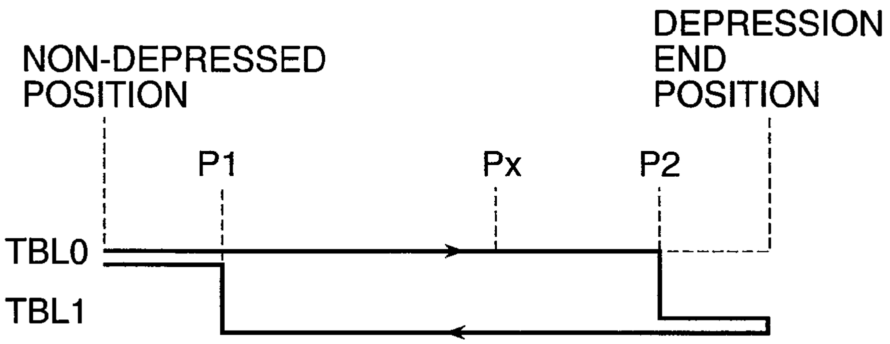
FIG. 5A to FIG. 5C are conceptual views each showing how a table for the conversion is selected with progress of forward and reverse pedal strokes in a case where three tables are provided in one table group.
Figure 5B:
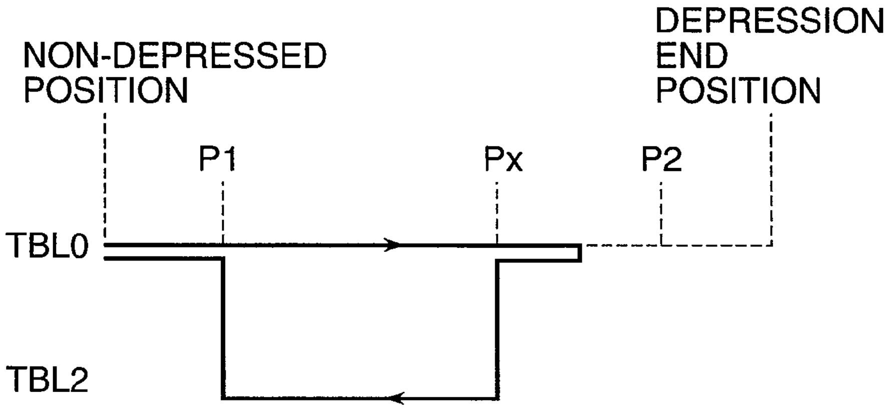
Figure 5C:
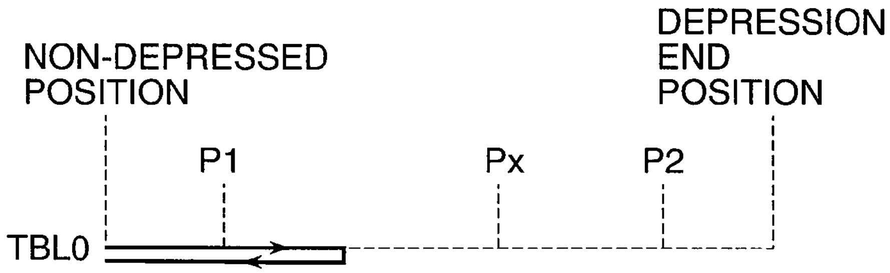

FIGS. 5A to 5C each show, in conceptual view, how a desired table is selected in the forward and reverse pedal strokes in a case where three tables are provided in one table group. It is assumed that the table group includes a default table TB0, a first alternate table TBL1, and a second alternative table TBL2. In this example, an intermediate threshold value Px, as a third threshold value, is provided between the first and second threshold values P1, P2. In FIGS. 5A to 5C, rightward and leftward arrows indicate a forward stroke path and a reverse stroke path, respectively.

As shown in FIG. 5A, the default table TB0 is selected while the detection value representing the pedal depression position varies from the non-depressed position to the second threshold value P2 in the forward stroke. When the detection value passes the second threshold value P2 to the forward direction, the default table TB0 is switched to the first alternate table TBL1. In the subsequent reverse stroke, the first alternate table TBL1 is kept selected until the detection value reaches the first threshold value P1. When the detection value passes the first threshold value P1 to the reverse direction, the default table TB0 is selected. It should be noted that the manner of table selection in the example of FIG. 2C is the same as that in the example of FIG. 5A, provided that the intermediate threshold value Px is disregarded.

As shown in FIG. 5B, in a case where a shift from the forward stroke to the reverse stroke is made when the detection value is between the intermediate threshold value Px and the second threshold value P2, the second alternative table TBL2 is selected when the detection value passes the intermediate threshold value Px to the reverse direction in the reverse stroke. In the subsequent reverse stroke, the second alternative table TBL2 is kept selected until the detection value reaches the first threshold value P1, and the default table TB0 is selected when the detection value passes the first threshold value P1 to the reverse direction.

As shown in FIG. 5C, in a case where a shift from the forward stroke to the reverse stroke is made when the detection value is between the first threshold value P1 and the intermediate threshold value Px, the default table TB0 is kept selected at and after the shift to the reverse stroke.

As described above, in the construction of FIGS. 5A to 5C where the conversion table is switched on condition that the detection value passes any of the threshold values, the table to be selected is decided according to a threshold value precedingly passed by the detection value and the direction to which another threshold value is currently passed by the detection value. Thus, the table can appropriately be selected, even if the manipulation direction of the pedal 24 is changed in the middle of pedal manipulation stroke. The number of tables in each table group and the number of threshold values can be greater than three. In that case, by an appropriate design, the characteristic of the musical tone control responsive to pedal manipulation can be set, with simple construction, for each pedal manipulation stroke section.

It should be noted that in the above described examples, it is preferable for stable control that an output value converted from a detection value detected at depression depth corresponding to each threshold value is made coincident between the tables belonging to the same table group.

As far as the setting of the characteristic of the musical tone control responsive to pedal manipulation for each section of the pedal manipulation stroke is concerned, each table group is not essentially required to include tables having a hysteresis section. It is enough for the table group to include tables having sections where the same detection value is converted into different output values by the tables.

In the above described embodiment and modifications, the tables are shown as example conversion patterns for conversion from detection value into output value. However, the conversion patterns are not limited to the tables and can be implemented by using arithmetic expressions. The output value is not limited to the MIDI value and can be any value able to be used for the musical tone parameter control.

In a case that arithmetic expressions are used as conversion patterns, arithmetic expressions are decided in advance for respective ones of forward stroke sections and reverse stroke sections, which are determined by dividing the entire pedal forward stroke and the entire pedal reverse stroke, respectively. In accordance with results of determination of which stroke is currently executed and determination to which section the current detection value belongs, one of the arithmetic expressions is selected, and an output value (control signal) is obtained from the detection value (pedal depression position) based on the selected arithmetic expression.

In the following, example arithmetic expressions are described with reference to FIG. 2C in which K0 to K7 denote coordinate points in a detection value-output value coordinate system, and coordinate values xi, yi (i=1, 2, . . . , 7) represent detection values and output values, respectively. The coordinate values x0, x4 correspond to the non-depression position and the depression end position of the pedal. The entire forward stroke is divided into first to fourth forward stroke sections (from x0 to x1, from x1 to x2, from x2 to x3, and from x3 to x4), and first to fourth arithmetic expressions for these stroke sections are determined in advance. The entire reverse stroke is divided into first through fourth reverse stroke sections (from x4 to x5, from x5 to x6, from x6 to x7, and from x7 to x0), and fifth to eighth arithmetic expressions for these stroke sections are determined in advance. For example, the first arithmetic expression is determined such that an output value varying from y0 to y1 with a first predetermined inclination is obtained when the detection value varies from x0 to x1. The other arithmetic expressions are similarly determined. Arithmetic processing based on the arithmetic expressions can be executed at intervals of a predetermined cycle, e.g., by timer interruption processing.

In the forward stroke, with the increasing detection value, the output value varies from y0 to y1 with the first predetermined inclination, from y1 to y2 with the second predetermined inclination (zero in FIG. 2C), from y2 to y3 with the third predetermined inclination, and from y3 to y4 with the fourth predetermined inclination (the coordinate point varies from K0 to K1, from K1 to K2, from K2 to K3, and from K3 to K4). In the reverse stroke, with the decreasing detection value, the output value varies from y4 to y5, from y5 to y6, from y6 to y7, and from y7 to y0 (the coordinate point varies from K4 to K5, from K5 to K6, from K6 to K7, and from K7 to K0).

In the above described embodiment, the pedal apparatus 10 is assumed to be fabricated separately from the keyboard apparatus 20, but the pedal apparatus 10 can be incorporated into the keyboard apparatus 20.

What is claimed is:

1. A pedal apparatus for outputting a control signal for use by an electronic keyboard apparatus to control a musical tone parameter, comprising:

a pedal operable in forward and reverse directions by a depression manipulation and a depression-releasing manipulation;

a detection unit configured to detect a detection value representing a position of said pedal in a depression depth direction;

a conversion unit having a plurality of conversion patterns each for conversion of the detection value detected by said detection unit to an output value, said conversion unit being configured to change a conversion pattern to be used for the conversion on condition that the detection value passes a threshold value in a forward or reverse stroke of said pedal and convert the detection value to the output value in accordance with the conversion pattern after change; and an output unit configured to output, as the control signal, the output value converted by said conversion unit;

wherein a hysteresis section, in which the output value converted by said conversion unit from the same detection value detected by said detection unit becomes smaller in the reverse stroke than in the forward stroke of said pedal, is present in a conversion characteristic exhibited by said conversion unit in a case where said pedal is reciprocated over an entire stroke between a non-depressed position and a depression end position of said pedal.

2. The pedal apparatus according to claim 1, wherein an intermediate section in which a degree of change in the output value with a change in the detection value is small is present in a pedal depression depth section between the non-depressed position and the depression end position of said pedal, and the hysteresis section is provided adjacent to at least one of a shallow depression depth side and a deep depression depth side of the intermediate section.

3. The pedal apparatus according to claim 2, wherein the intermediate section is provided on a side where the depression depth is deeper in the reverse stroke than in the forward stroke of said pedal.

4. The pedal apparatus according to claim 1, wherein a plurality of the threshold values are provided, and said conversion unit decides the conversion pattern to be used for the conversion according to one of the threshold values precedingly passed by the detection value and a direction to which another threshold value is currently passed by the detection value.

5. The pedal apparatus according to claim 1, wherein a plurality of the threshold values are provided, and the threshold values at least include values respectively corresponding to the non-depressed position and the depression end position of said pedal.

6. An electronic keyboard apparatus having a plurality of keys, comprising:

a musical tone generator configured to generate a musical tone in response to any of the keys being manipulated;

the pedal apparatus as set fourth in claim 1; and a musical tone parameter control unit configured to use the output value output from the output unit of the pedal apparatus as the control signal, and based on the control signal, control a musical tone parameter for the musical tone generated by said musical tone generator.

7. The pedal apparatus according to claim 1, wherein said conversion patterns are calculated by means of a plurality of arithmetic expressions decided in advance for a plurality of forward stroke sections determined by dividing the entire pedal forward stroke and for a plurality of reverse stroke sections determined by dividing the entire pedal reverse stroke, respectively, said conversion unit selects one of the arithmetic expressions in accordance with results of determination of which stroke is currently executed and determination to which section the current detection value belongs, and obtains the output value from the detection value based on the selected one of the arithmetic expressions, and said output unit configured to output, as the control signal, the output value obtained by said conversion unit.

8. A pedal apparatus for outputting a control signal for use by an electronic keyboard apparatus to control a musical tone parameter, comprising:

a pedal operable in forward and reverse directions by a depression manipulation and a depression-releasing manipulation;

a detection unit configured to detect a detection value representing a position of said pedal in a depression depth direction;

a conversion unit configured to convert the detection value detected by said detection unit into an output value; and an output unit configured to output, as the control signal, the output value converted by said conversion unit, wherein a hysteresis section, in which the output value converted by said conversion unit from the same detection value detected by said detection unit becomes smaller in the reverse stroke than in the forward stroke of said pedal, is present in a conversion characteristic exhibited by said conversion unit in a case where said pedal is reciprocated over an entire stroke between a non-depressed position and a depression end position of said pedal.

9. The pedal apparatus according to claim 8, wherein an intermediate section in which a degree of change in the output value with a change in the detection value is small is present in a pedal depression depth section between the non-depressed position and the depression end position of said pedal, and the hysteresis section is provided adjacent to at least one of a shallow depression depth side and a deep depression depth side of the intermediate section.

10. An electronic keyboard apparatus having a plurality of keys, comprising:

a musical tone generator configured to generate a musical tone in response to any of the keys being manipulated;

the pedal apparatus as set fourth in claim 8; and a musical tone parameter control unit configured to use the output value output from the output unit of the pedal apparatus as the control signal, and based on the control signal, control a musical tone parameter for the musical tone generated by said musical tone generator.

* * * * *